United States Patent [19]
Nagano

[11] Patent Number: 4,778,436
[45] Date of Patent: Oct. 18, 1988

[54] FRONT DERAILLEUR FOR A BICYCLE

[75] Inventor: Masashi Nagano, Izumi, Japan

[73] Assignee: Shimano Industrial Company Limited, Osaka, Japan

[21] Appl. No.: 35,382

[22] Filed: Apr. 7, 1987

[30] Foreign Application Priority Data

Apr. 11, 1986 [JP] Japan .................. 61-84582

[51] Int. Cl.$^4$ .................................... F16H 9/00
[52] U.S. Cl. ............................. 474/80; 474/82
[58] Field of Search ..................... 474/78-83

[56] References Cited

U.S. PATENT DOCUMENTS 4,279,605 7/1981 Egami .................. 474/82
4,543,078 9/1985 Coue ................... 474/82

FOREIGN PATENT DOCUMENTS 2294079 12/1974 France ................. 474/82

Primary Examiner—Thuy M. Bui
Attorney, Agent, or Firm—Stevens, Davis, Miller & Mosher

[57] ABSTRACT

A derailleur is provided which includes a linkage mechanism including a fixing member, a chain guide for guiding the driving chain relative to a gear assembly, and a linkage device. The chain guide has an inner guide plate and an outer guide plate which are (1) generally parallel to one another, (2) adapted to be oriented perpendicular to the axis of the gear assembly and (3) extend in a longitudinal dimension which is adapted to be oriented longitudinally of the bicycle when the derailluer is mounted on the bicycle. The linkage device supports the chain guide to the fixing member so that the chain guide is movable axially with respect to the gear assembly. The linkage device has one end pivotably supported to the fixing member by a first pivot shaft and another end pivotably supported to the chain guide by a second pivot shaft. The first pivot shaft and the second pivot shaft both extend obliquely relative to (1) the longitudinal dimension of the inner and outer guide plates and (2) a plane generally parallel to the inner and outer guide plates. The rear ends of the first and second pivot shafts are disposed closer than their front ends to a central plane of the bicycle.

3 Claims, 2 Drawing Sheets

FRONT DERAILLEUR FOR A BICYCLE

FIELD OF THE INVENTION

The present invention relates to a front derailleur for a bicycle, and more particularly, to a front derailleur for a bicycle, which is provided with a linkage mechanism comprising a fixing member, a chain guide, and linkage members supporting the chain guide to the fixing member, the linkage mechanism being deformed to move the chain guide axially of a multistage front gear assembly to thereby shift a driving chain from one gear to another.

BACKGROUND OF THE INVENTION

The above type of front derailleur for a bicycle has hitherto been well-know, and is disclosed in, for example, Japanese Utility Model Publication Gazette No. Sho 55-8,707. This front derailleur is provided with a fixing member fixed to the bicycle frame, a chain guide having an outer guide plate and an inner guide plate, and linkage members comprising a pair of parallel link plates. The linkage members are connected to the fixing member and chain guide through pivot pins extending perpendicularly to the axis of the multistage front gears to thereby form a linkage mechanism for allowing the chain guide to move axially of the front gear. A control wire is pulled to deform the linkage mechanism so as to move the chain guide axially of the front chain gear, thereby shifting the chain to a selectable one of the multistage front gears for changing the bicycle speed.

The front derailleur for the bicycle is provided with a return spring between the linkage member and the fixing member, by which the chain guide is biased toward the bicycle frame, that is, from a larger diameter front gear to a smaller diameter one. The control wire is pulled against the return spring to forcibly move the chain guide, thereby shifting the chain from the smaller diameter front gear to the larger diameter one, and the control wire is loosened to return the chain guide by the restoring force of the return spring, thereby shifting the chain to the smaller diameter gear.

In the front derailleur for the bicycle as described above, mention when the chain is shifted from the smaller diameter front gear to the larger diameter gear to increase the bicycle speed, the control wire is pulled against the return spring to forcibly move the chain guide. This is not so problematical. However, when the chain is shifted from the larger diameter front gear to the smaller diameter gear to reduce the bicycle speed, particularly, the chain guide is adapted to move only by a restoring force of the return spring, the force being applied to the chain to the smaller diameter front gear becomes small if the restoring force of the return spring is small. Furthermore a chain urging portion of the chain guide, when the bicycle speed is reduced, moves away from the engaging point of the chain with the front gear, thereby often causing a poor speed change efficiency.

SUMMARY OF THE INVENTION

In light of the above problem, the present invention has been designed. An object of thereof is to provide a front derailleur for a bicycle, provided with a linkage mechanism comprising a fixing member, a chain guide, and linkage members supported to the chain guide through pivot shafts wherein, the pivot shafts are mounted slantwise and the chain guide is displaced toward the front of the bicycle and close to the front gear when the bicycle speed is reduced. This enables the amounts of deflection of the chain guide and chain to be reduced, and also the chain is guided slantwise to the smaller diameter front gear, thereby yielding improved efficiency for reducing the bicycle speed.

The front derailleur for the bicycle of the invention is provided with a linkage mechanism comprising a fixing member fixed to the bicycle frame, a chain guide having an outer guide plate and an inner guide plate, and linkage members for supporting the chain guide to the fixing member through pivot shafts so that the linkage mechanism is deformed to move the chain guide axially of the multistage front gear. The invention is characterized in that the axis of each pivot shaft is slanted in a manner that the rear end thereof in the longitudinal direction of the bicycle is positioned away from the chain guide and closest to the bicycle frame, whereby the chain guide, when moved axially inwardly of the front chain gear, is also displaced toward the front of the bicycle.

When the chain guide is moved axially inwardly of the multistage front gears to shift the chain from the larger diameter front gear to the smaller diameter gear to reduce the bicycle speed, the chain guide, while being displaced toward the front of the bicycle around the pivot shaft, moves to the smaller diameter front gear. Hence, the chain guide quickly urges the chain to be shifted to the smaller diameter gear, thus improving the speed change efficiency for the speed reduction.

In other words, when the chain is shifted from the larger diameter front gear to the smaller diameter gear, the chain guide is displaced toward the front of the bicycle so as to approach the front gear, whereby the amounts of deflection of the chain guide and chain can be reduced and the chain can be guided slantwise to the smaller diameter front gear. As a result, the speed change efficiency for reducing the bicycle speed can be remarkably improved.

The above and further objects and novel features of the invention will be more fully apparent from the following detailed description when the same is read in connection with the accompanying drawings.

DETAILED DESCRIPTION OF THE INVENTION

Figure 1:
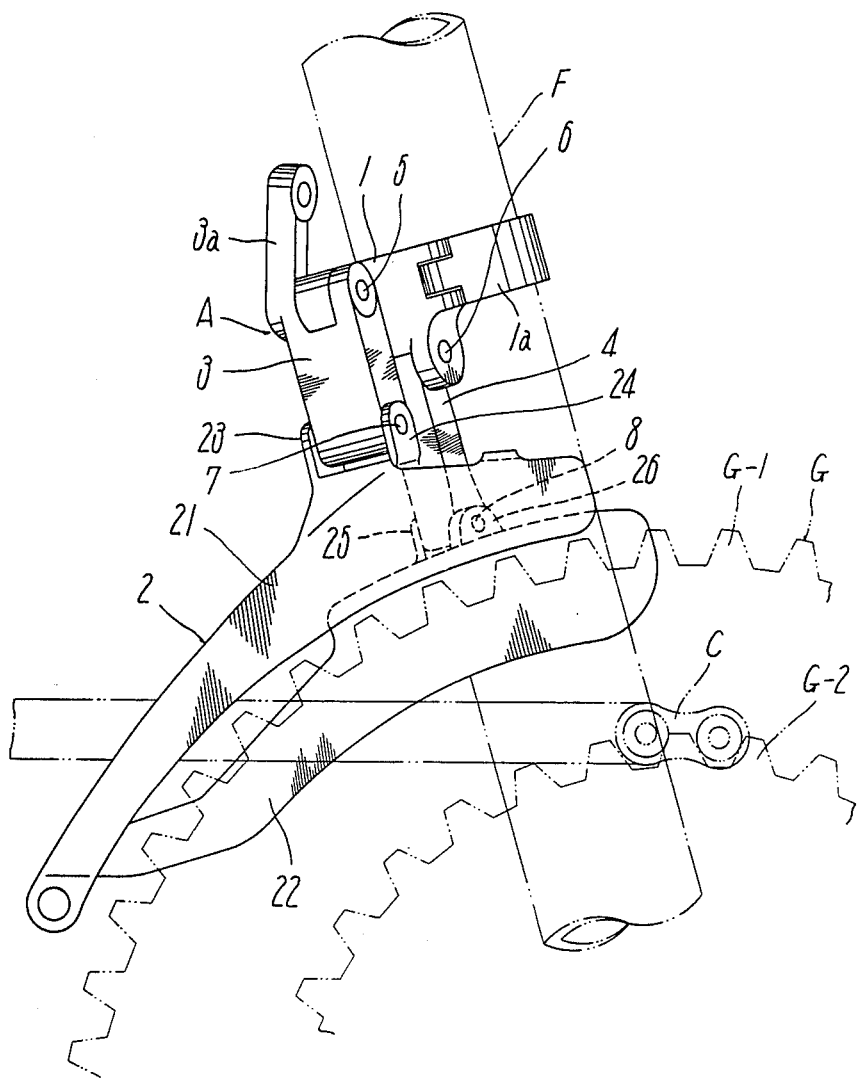
FIG.1 is a front view of an embodiment of a front derailleur of the invention.
Figure 2:
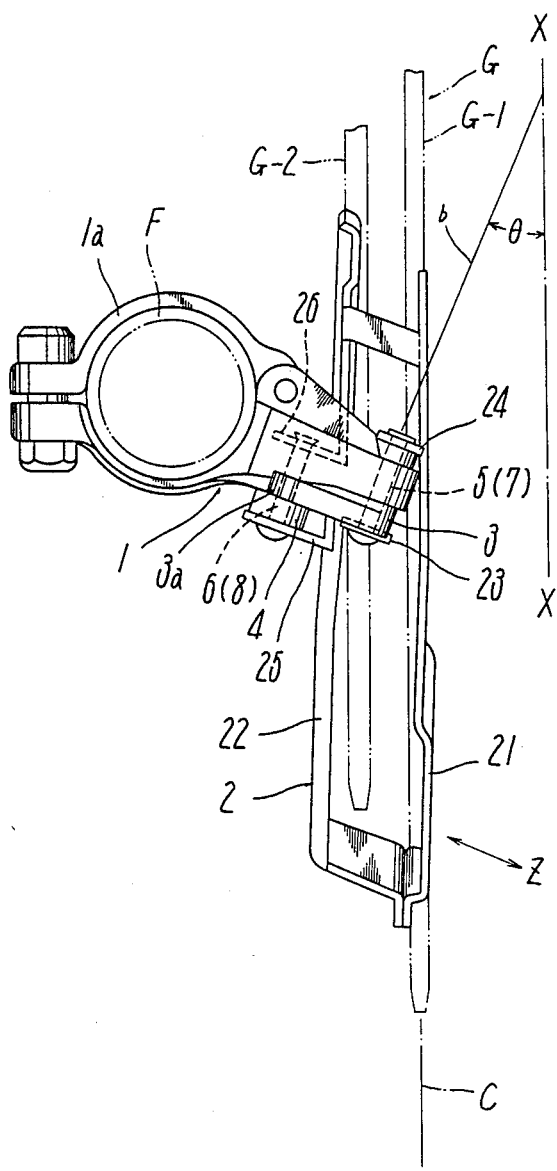
FIG.2 is a plan view of the FIG. 1 embodiment.

Referring to FIG. 1, a front derailleur is shown which comprises a fixing member 1 fixed to a seat tube F of the bicycle through a mounting band 1a, a chain guide 2 having an outer guide plate 21 and an inner guide plate 22 and guiding a driving chain C to one of multistage front gears at the bicycle, first and second linkage members 3 and 4 supported movably to the fixing member 1, first pivot shafts 5 and 6 for pivotally supporting the upper ends of the linkage members 3 and 4 to the fixing member 1, and second pivot shafts 7 and 8 for pivotally supporting the lower ends of the linkage members 3 and 4 to the chain guide 2, the fixing member 1, first and second linkage members 3 and 4 and chain guide 2 being connected through the pivot shafts 5 to 8 to constitute a parallelogrammic linkage mechanism A. In addition, in the above construction, the outer and inner guide plates 21 and 22, as shown in FIG. 2, are disposed perpendicularly to the axis of the multistage front gears G and in the same direction as the line X—X extending longitudinally of the bicycle and supported to the fixing member 1 through the linkage members 3 and 4 respectively.

An operating member 3a extending upwardly is provided at the first linkage member 3 and connected through a control wire to a control lever mounted on the bicycle handle (not shown), the control lever being operated to actuate the operating member 3a to move the linkage members 3 and 4 in swinging motion, thereby moving the chain guide 2 axially of the multistage front gears G supported to the lower portion of the seat tube F.

The multistage front gears G have at the axial outside a larger diameter gear G-1 and at the axial inside a smaller diameter gear G-2 so that the chain guide moves to shift the chain C to each gear G-1 or G-2 for changing the bicycle speed.

The embodiment in the drawing is provided between the chain guide 2 and the linkage member 3 with a return spring (not shown) for biasing the chain guide 2 toward the smaller diameter gear G-2.

In the front derailleur for the bicycle as above-mentioned, the pivot shafts 5 through 8, as shown by the dotted line in FIG. 2, each have a length longitudinal of the bicycle and slanted at an angle of, for example, 20° in the direction of moving the longitudinally rear ends of the pivot shafts 5 to 8 away from the chain guide 2 and toward the seat tube F with respect to the longitudinally front ends, so that when the chain guide 2 moves from the larger diameter gear G-1 to the smaller diameter gear G-2 for reducing the bicycle speed, the chain guide is adapted to be displaced toward the front of the bicycle while being moved axially of the front gear G.

Concretely, as seen from FIG. 2, the axis b of the respective pivot shafts 5 to 8 is slanted at an angale of θ with respect to the line X—X perpendicular to the axis of the front gear G and extending longitudinally of the bicycle so that the chain guide, when intended to move axially of the front gear G, moves perpendicularly to the axis b of the respective pivot shafts 5 to 8, in other words, in the direction of the arrow Z in FIG. 2.

Thus, the chain guide 2, when the chain is shifted from the larger diameter gear G-1 to the smaller diameter gear G-2 for reducing the bicycle speed, is moved in the direction of the arrow Z while being moved axially of the front gear G. In other words, an urging portion for the chain C formed at the other guide plate 21 is displaced toward the front of the bicycle. Hence the urging portion can guide the chain slantwise to the smaller diameter gear G-2, thereby enabling the speed change efficiency for the speed reduction to be improved.

In the above-mentioned construction, when the urging portion at the outer guide plate 21 urges the chain C to be shifted to the smaller diameter gear G-2 for reducing the bicycle speed, a distance between the urging portion and the connecting portions of linkage members 3 and 4 with the chain guide 2 is made smaller to reduce a deflection amount of the chain guide 2. Moreover, a distance between the engaging point of the chain C with the front gear G and the urging portion at the outer guide plate 21 is reduced and also the deflection amount of the chain C is reduced, thereby improving the speed change efficiency for reducing the bicycle speed.

Furthermore, when the pivot shafts 5 to 8 are slanted with respect to the longitudinal direction of the bicycle as above-mentioned, the front derailleur as a whole can reasonably be mounted on the rear side of the seat tube F.

In addition, in the above-mentioned embodiment, the linkage members 3 and 4 are connected to the chain guide 2 in such a manner that the chain guide 2 are provided with a pair of first mounting projections 23 and 24 opposite to each other and a pair of second mounting projections 25 and 26 opposite to each other, the lower ends of the linkage members 3 and 4 are inserted between the opposite mounting projections 23 and 24, and 25 and 26 respectively, and the second pivot shafts 7 and 8 are inserted in shaft bores provided at the mounting projections 23 through 26 respectively. The opposite mounting surfaces of the mounting projections 23 through 26, as shown in FIG. 2, are slanted longitudinally with respect to the guide plates 21 and 22, whereby the second pivot shafts 7 and 8 supported between the mounting projections 23 and 24 and between the mounting projections 25 and 26 are slanted in the aforesaid direction.

Alternatively, the linkage mechanism may use a single linkage member to form the parallelogrammic mechanism.

Also, the front derailleur of the invention may of course be used for, for example, threestage front gears comprising a smaller diameter gear, a middle diameter gear and a larger diameter gear.

While an embodiment of the invention has been shown and described, the invention is not limited to the specific construction thereof, which is merely exemplary in the specification rather than defined.

What is claimed is:

1. A front derailleur for a bicycle for shifting a driving chain from one gear to another of a multistage front gear assembly having a plurality of axially spaced generally parallel gears, said derailleur comprising:
 a linkage mechanism comprising (i) a fixing member adapted to fix said derailleur to a frame of said bicycle, (ii) a chain guide adapted to guide said driving chain axially relative to said gear assembly, said chain guide having an inner guide plate and an outer guide plate generally parallel to one another and oriented in a predetermined direction adapted to be perpendicular to an axis of said gear assembly, said inner and outer guide plates being elongated in a longitudinal dimension adapted to be oriented longitudinally of said bicycle and having rear ends adapted to be closest to a rear end of said bicycle when said derailleur is mounted on said bicycle, and (iii) a linkage means supporting the chain guide to the fixing member so that the chain guide is movable in a direction adapted to be axial of said gear assembly, said linkage means having one end pivotably supported to said fixing member by a first pivot shaft and another end pivotably supported to said chain guide by a second pivot shaft, said first pivot shaft and said second pivot shaft being spaced apart and oriented such that when said derailleur is mounted on said bicycle, said first pivot shaft is positioned above said second pivot shaft relative to a top side of said bicycle, and
 said first pilot shaft and said second pivot shaft both having a longitudinal axis oriented in a plane adapted to be generally perpendicular to a central plane containing said frame of said bicycle and extending obliquely relative to (i) said longitudinal dimension of said inner and outer guide plates and (ii) a plane generally parallel to said inner and outer guide plates, such that rear ends of said first and second pivot shafts located closest to said rear ends of said inner and outer guide plates are adapted to be disposed closer to said central plane and farther from said chain guide than front ends of said first and second pivot shafts.

2. A front derailleur for a bicycle according to claim 1, wherein said chain guide comprises mounting means for connecting said chain guide with said linkage means, said mounting means comprising mounting faces which are oriented obliquely with respect to said guide plates at said chain guide respectively.

3. A front derailleur for a bicycle according to claim 1, wherein each of said first and second pivot shafts is oriented obliquely at an angle of about 20° relative to (i) said longitudinal dimension of said inner and outer guide plates and (ii) said plane generally parallel to said inner and outer guide plates.

* * * * *